| (12) United States Patent | (10) Patent No.: US 6,441,099 B1 |
|---|---|
| Connell et al. | (45) Date of Patent: *Aug. 27, 2002 |

(54) PHENYLETHYNYL CONTAINING REACTIVE ADDITIVES

(75) Inventors: John W. Connell, Yorktown; Joseph G. Smith, Jr., Smithfield; Paul M. Hergenrother, Yorktown, all of VA (US)

(73) Assignee: The United States of America as represented by the Administrator of the National Aeronautics and Space Adminstration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/726,297

(22) Filed: Nov. 28, 2000

Related U.S. Application Data

(62) Division of application No. 09/290,295, filed on Apr. 13, 1999.

(51) Int. Cl.[7] .............................. C08J 3/00; C08K 5/20; C08K 5/36; C08K 5/48; C08L 49/00; C08F 38/00
(52) U.S. Cl. ..................... 525/328.1; 524/210
(58) Field of Search ........................ 525/328.1; 524/210

(56) References Cited

U.S. PATENT DOCUMENTS 5,567,800 A * 10/1996 Hergenrother et al. ...... 528/353

* cited by examiner

*Primary Examiner*—Patrick D. Niland
(74) *Attorney, Agent, or Firm*—Hillary W. Hawkins; Patrick F. Roughen, Jr.

(57) ABSTRACT

Phenylethynyl containing reactive additives were prepared from aromatic diamines containing phenylethynyl groups and various ratios of phthalic anhydride and 4-phenylethynylphthalic anhydride in glacial acetic acid to form the imide in one step or in N-methyl-2-pyrrolidinone to form the amide acid intermediate. The reactive additives were mixed in various amounts (10% to 90%) with oligomers containing either terminal or pendent phenylethynyl groups (or both) to reduce the melt viscosity and thereby enhance processability. Upon thermal cure, the additives react and become chemically incorporated into the matrix and effect an increase in crosslink density relative to that of the host resin. This resultant increase in crosslink density has advantageous consequences on the cured resin properties such as higher glass transition temperature and higher modulus as compared to that of the host resin.

56 Claims, 5 Drawing Sheets

PHENYLETHYNYL CONTAINING REACTIVE ADDITIVES

CROSS-REFERENCE

This patent application is related to commonly owned patent application Ser. No. 09/310,686, filed Apr. 13, 1999, now U.S. Pat. No. 6,124,035, and is a divisional application of co-pending patent application Ser. No. 09/290,295, filed Apr. 13, 1999.

ORIGIN OF THE INVENTION

The invention described herein was made by employees of the United States Government and may be manufactured and used by or for the Government or government purposes without payment of any royalties therein or therefor.

BACKGROUND OF THE INVENTION

A variety of monomers, oligomers and polymers containing ethynyl (acetylenic) and substituted ethynyl (i.e., phenylethynyl) groups have been reported. The ethynyl groups in the polymer are either pendent to the chain, in the chain or at the chain ends. Many of these materials have been used to prepare coatings, moldings, adhesives and composites [P. M. Hergenrother, "Acetylene Terminated Prepolymers" in Encyclopedia of Polymer Science and Engineering, John Wiley and Sons, New York, Vol. 1, 61 (1985)]. Good processability by either solution casting and/or compression molding have been observed for the ethynyl and substituted ethynyl containing materials. In general, thermally cured ethynyl and substituted ethynyl containing materials exhibit a favorable combination of physical and mechanical properties. Some ethynyl endcapped materials such as the Thermid® resins are commercially available (National Starch and Chemical Co., Bridgewater, N.J. 08807). Other systems such as acetylene terminated sulfone have undergone extensive evaluation as matrix resins [M. G. Maximovich, S. C. Lockerby, F. E. Arnold and G. A. Loughran, Sci. Adv. Matls. Proc. Eng. Ser., 23, 490 (1978) and G. A. Loughran, A. Wereta and F. E. Arnold, U.S. Pat. No. 4,131,625, 12/78 to U.S. Air Force].

Phenylethynyl containing amines have been used to terminate imide oligomers [F. W. Harris, A. Pamidimuhkala, R. Gupta, S. Das, T. Wu, G. Mock, Poly. Prep., 24 (2), 325, 1983; F. W. Harris, A. Pamidimuhkala, R. Gupta, S. Das, T. Wu, G. Mock, *Macromol. Sci.-Chem.*, A21 (8&9), 1117 (1984); C. W. Paul, R. A. Shultz, and S. P. Fenelli, "High Temperature Curing Endcaps for Polyimide Oligomers" in Advances in Polyimide Science and Technology, (Ed. C. Feger, M. M. Khoyasteh, and M. S. Htoo), Technomic Publishing Co., Inc., Lancaster, Pa., 1993, p. 220; R. G. Bryant, B. J. Jensen, P. M. Hergenrother, *Poly. Prepr.*, 34(1), 566, 1993 ]. Imide oligomers terminated with ethynyl phthalic anhydride [P. M. Hergenrother, *Poly. Prepr.*, 21 (1), 81, 1980 ], substituted ethynyl phthalic anhydride [S. Hino, S. Sato, K. Kora, and O. Suzuki, Jpn. Kokai Tokyo Koho Japanese Patent No. 63,196,564. Aug. 15, 1988; *Chem. Abstr.*, 115573 w, 110, (1989)] and phenylethynyl containing phthalic anhydrides have been reported. Imide oligomers containing pendent substituted ethynyl groups [F. W. Harris, S. M. Padaki, and S. Varaprath, *Poly. Prepr.*, 21 (1), 3, 1980 (abstract only); B. J. Jensen, P. M. Hergenrother and G. Nwokogu, Polymer, 34 (3), 630, 1993; B. J. Jensen and P. M. Hergenrother, U.S. Pat. No. 5,344,982 (Sep. 6, 1994)] have been reported. See also J. E. McGrath and G. W. Meyer, U.S. Pat. No. 4,493,002 (Feb. 20, 1996), J. G. Smith, Jr. Adhesion Society Proceedings, Vol. 19, 29–32 (1996) and J. W. Connell, J. G. Smith, Jr. And P. M. Hergenrother, *Society for the Advancement of Materials and Process Engineering Proceedings*, Vol. 41, 1102–1112 (1996).

High temperature resins are used in a variety of aerospace and non-aerospace applications. Generally these materials require high pressures (>200 psi) to form adhesive bonds, well consolidated moldings or fiber reinforced composite laminates. However, there exists a need for novel high temperature resins that can be processed at low pressures and without an autoclave (i.e., under vacuum bag conditions--~15 psi) while maintaining excellent mechanical properties.

It is a primary object of the present invention to provide novel phenylethynyl containing reactive additives (PERAs) which can be used with any phenylethynyl containing polymer, co-polymer, oligomers or co-oligomers to decrease melt flow and consequently processing pressures required to fabricate molded parts, adhesive bonds, and fiber reinforced composite parts.

SUMMARY OF THE INVENTION

According to the present invention the forgoing and additional objects are obtained by synthesizing amide acid and imide phenylethynyl reactive additives, subsequently adding them to phenylethynyl containing polymers, co-polymers, oligomers and co-oligomers in solution or by mixing dry imide powder of the reactive additive with phenylethynyl containing oligomer powder. These species can be combined in several different ways: as solutions of amide acid of the phenylethynyl containing reactive additive (PERA) to a solution of the phenylethynyl containing polymer, co-polymer, oligomer, co-oligomer; as solutions of the imide of the PERA to solutions of the phenylethynyl containing polymer, co-polymer, oligomer, co-oligomer and by dry mixing of the imide powder of the PERA to the dry powder of the phenylethynyl containing polymer, co-polymer, oligomer, co-oligomer. The effect of these reactive additives on the processability and properties on the resin systems depends upon the form of the PERA (i.e., imide vs. amide acid) used.

The PERA reduce the melt viscosity of the phenylethynyl containing polymer, co-polymer, oligomer, and co-oligomer to which they are added and thereby reduce the processing pressures required to form the adhesive bonds, consolidated filled or unfilled moldings or to fabricate fiber reinforced composite laminates. Upon thermal cure the PERAs react with themselves as well as with the phenylethynyl containing host resin and thereby become chemically incorporated into the resin system. The effect on mechanical properties, relative to those of the host resin, are dependent on the amount of PERA used, but typically result in higher $T_g$s, higher mechanical properties such as modulus and compressive properties as well as higher retention of these mechanical properties at elevated temperatures without significantly reducing toughness or damage tolerance (as determined by compression after impact strengths of quasi-isotropic laminates).

BRIEF DESCRIPTION OF THE DRAWING

For a more complete understanding of the present invention, including its objects and attending benefits, reference should be made to the Description of the Preferred Embodiments, which is set forth in detail below. This Detailed Description should be read together with the accompanying drawings, wherein.

DESCRIPTION OF THE PREFERRED EMBODIMENTS

Figure 1:
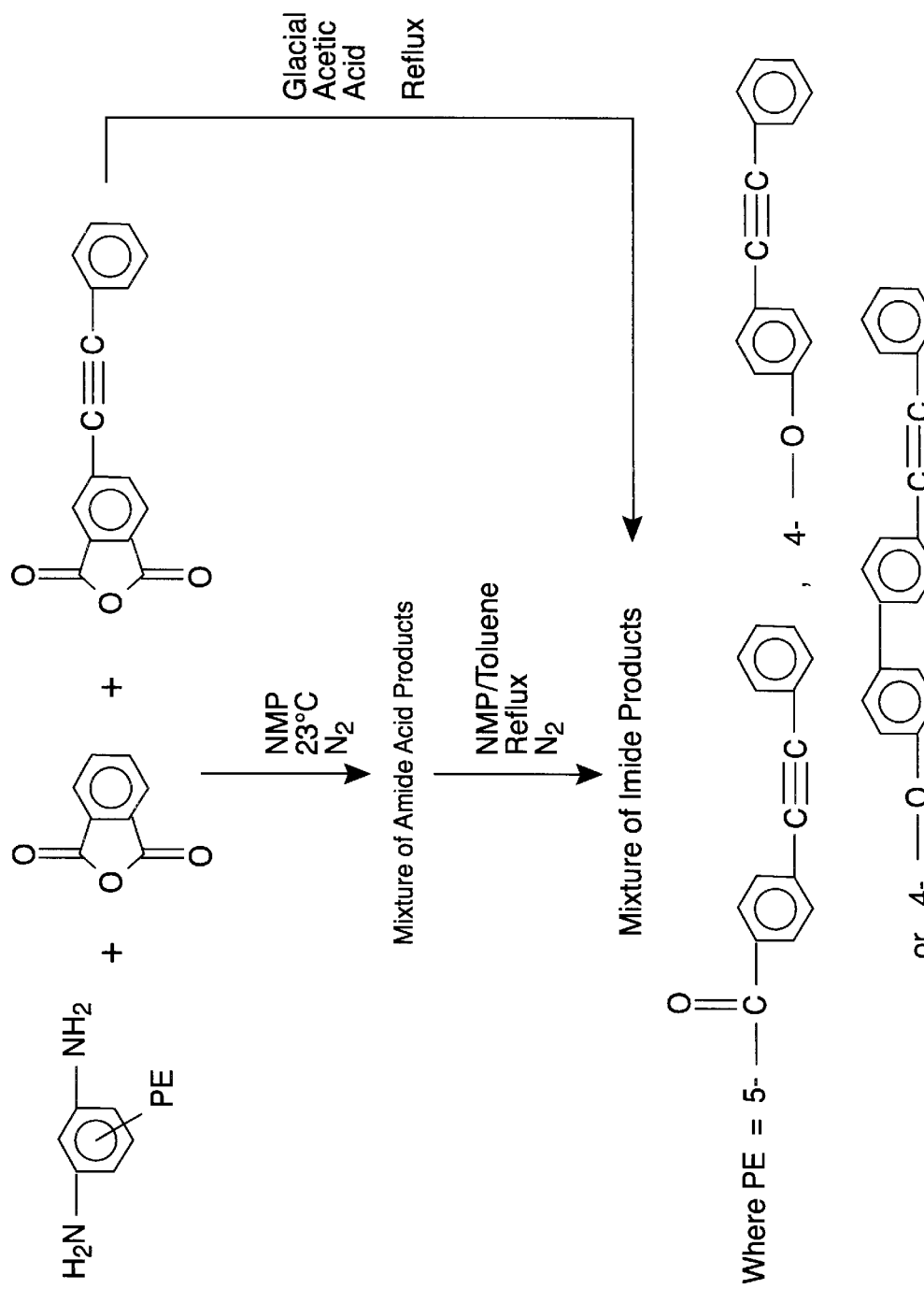
FIG. 1 is an equation showing the preparation of phenylethynyl reactive additives according to the present invention.

Phenylethynyl containing reactive additives are prepared from aromatic diamines containing phenylethynyl groups and various ratios of phthalic anhydride (PA) and 4-phenylethynylphthalic anhydride (PEPA) as depicted in FIG. 1. The PERAs may be used in both the amide acid and the imide form to lower the melt viscosity of the host phenylethynyl containing resin. The PERA amide acids are prepared by reacting a diamine containing phenylethynyl groups with a mixture of PA and PEPA in N-methyl-2-pyrrolidinone (NMP) at room temperature under nitrogen. The products remain soluble in NMP. The PERA imide products are prepared from the amide acid intermediate in NMP by adding toluene and heating the mixture to reflux (~150–160° C.) under nitrogen or in one step by reacting a diamine containing phenylethynyl groups with a mixture of PA and PEPA in refluxing glacial acetic acid. The imide products are soluble in NMP up to 50% solids by weight. Since all of the products from the reaction used to prepare the PERAs contain at least one phenylethynyl group, upon thermal cure with a phenylethynyl containing host resin, the PERAs react and become chemically incorporated onto the matrix and thus cannot migrate or leach out.

Three different PERAs were prepared and evaluated. PERA-1 was prepared from 3,5-diamino-4'-phenylethynylbenzophenone and an equimolar amount of PA and PEPA in refluxing glacial acetic acid. The amide acid of PERA-1 was prepared from 3,5-diamino-4'-phenylethynylbenzophenone and an equal molar amount of PA and PEPA in NMP at 23° C. under nitrogen. PERA-2 was prepared from 3,5-diamino-4'-phenylethynylbenzophenone (1.0 mole) and PA (1.5 mole) and PEPA (0.5 mole) in refluxing glacial acetic acid. PERA-3 was prepared from 3,5-diamino-4'-phenylethynylbenzophenone (1.0 mole) and PA (0.5 mole) and PEPA (1.5 mole) in refluxing glacial acetic acid. The PERAs were added to the host resin, which can be any polymer, co-polymer, oligomer, or co-oligomer containing phenylethynyl groups, in order to reduce the melt flow and increase the ease of processability. The phenylethynyl groups of the host resin can be either pendent, terminal or in the backbone or any combination thereof. The amount of additive to bring about the desired reduction in melt viscosity was dependent on the melt viscosity of the host resin. The PERAs (both amide acid and imide forms) were typically added as solid solutions (i.e., dry powder) to a solid solution of the phenylethynyl containing host resin and were subsequently processed into the desired form.

In one aspect the present invention is the process of adding phenylethynyl reactive additives (PERAs) to phenylethynyl containing polymers, co-polymers, oligomers and co-oligomers in solution or by mixing dry imide powder of the reactive additive with the phenylethynyl containing oligomer powder in order to reduce the melt flow and increase the ease of processability.

Figure 2:
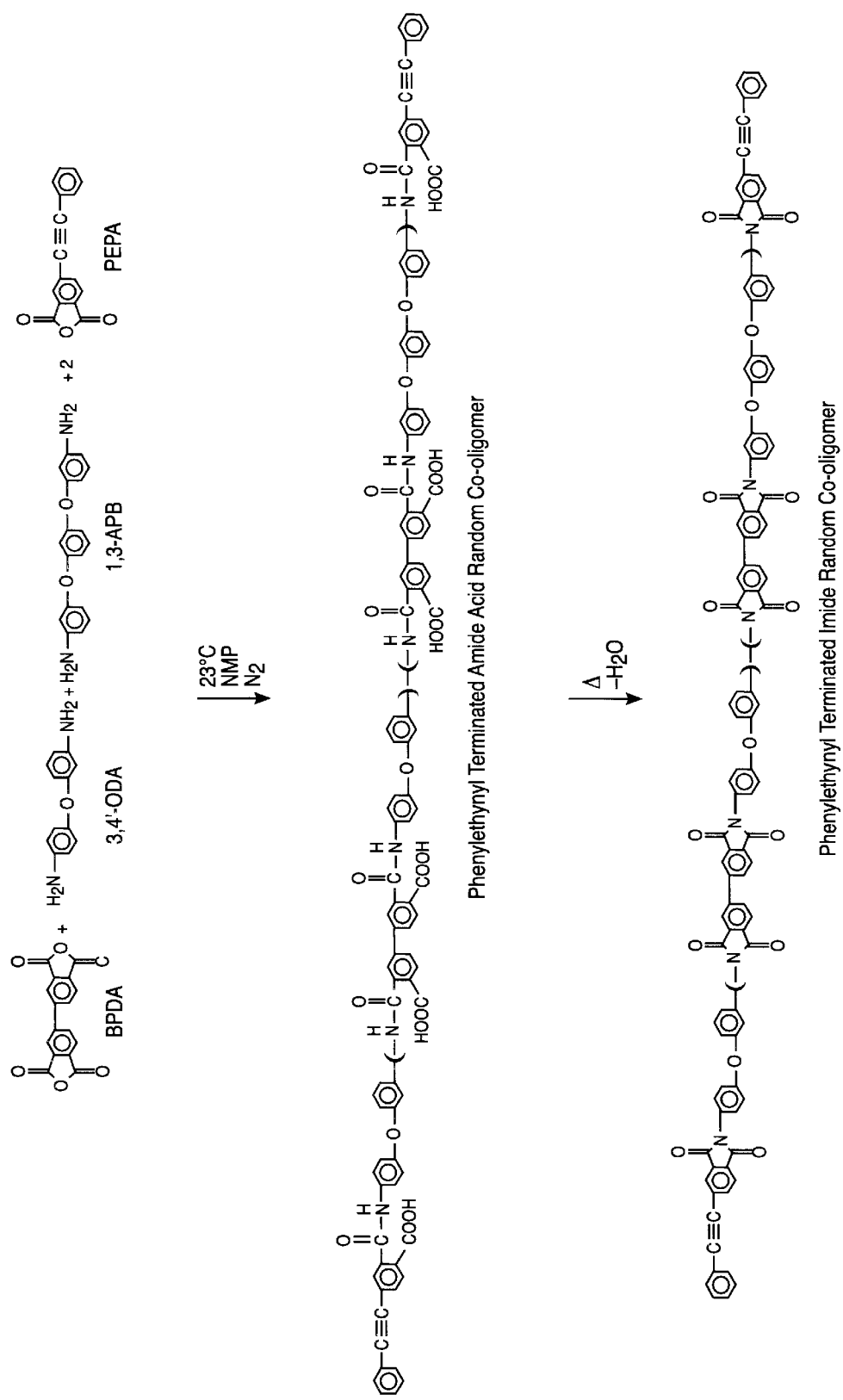
FIG. 2 is an equation showing the preparation of Random Amide Acid and Imide Co-oligomers (PETI-5).

The best results were obtained with formulations of PERA-1 and a phenylethynyl terminated amide acid co-oligomer with a calculated number average molecular weight of 5000 g/mole (designated as PETI-5). The PETI-5 amide acid 5 solution in NMP and imide powder were prepared from 3,4,3',4'-biphenyltetracarboxylic dianhydride (BPDA) (0.91 mole), 3,4'-oxydianiline (3,4'-ODA), 1,3-bis (3-aminophenoxy) benzene (1,3-APB) (0.15 mole) and 4-phenylethynylphthalic anhydride (PEPA) (0.18 mole) according to a procedure previously reported by P. M. Hergenrother and J. G. Smith, Jr., *Polymer Preprints*, 35(1), 353, 1994. The synthetic scheme is depicted in FIG. 2. PERA-1 in the imide form was physically mixed with PETI-5 imide powder in concentrations ranging from 10% to 90% by weight and the resultant formulations characterized for complex melt viscosity and thermal properties. The data is presented in Table 1.

TABLE 1

Characterization of Physically Mixed Imide Powders of PERA-1 and PETI-5

| PERA-1 Weight % | PETI-5, Weight % | Thermal Transition Temp., ° C. Initial | Thermal Transition Temp., ° C. Cured* (Melting temp.) | Minimum Complex Melt Viscosity, poise | Temp. of Minimum Viscosity, ° C. |
|---|---|---|---|---|---|
| 100 | 0 | 182 | ND | 0.1 | 270 |
| 90 | 10 | 182 | ND | 14 | 270 |
| 80 | 20 | 183 | ND | 21 | 373 |
| 65 | 35 | 182 | ND | 53 | 370 |
| 50 | 50 | 182 | ND | 500 | 371 |
| 35 | 65 | 183 | ND | 4700 | 372 |
| 20 | 80 | 182 | 273 (393) | 5600 | 369 |
| 15 | 85 | 185 | 276 (390) | 44700 | 371 |
| 10 | 90 | 183 | 278 (392) | 52000 | 371 |
| 0 | 100 | 235 | 250 (387) | 56500 | 371 |

*Cured 1 hour at 350° C. in a sealed aluminum pan.
ND = Not detected by DSC

Figure 3:
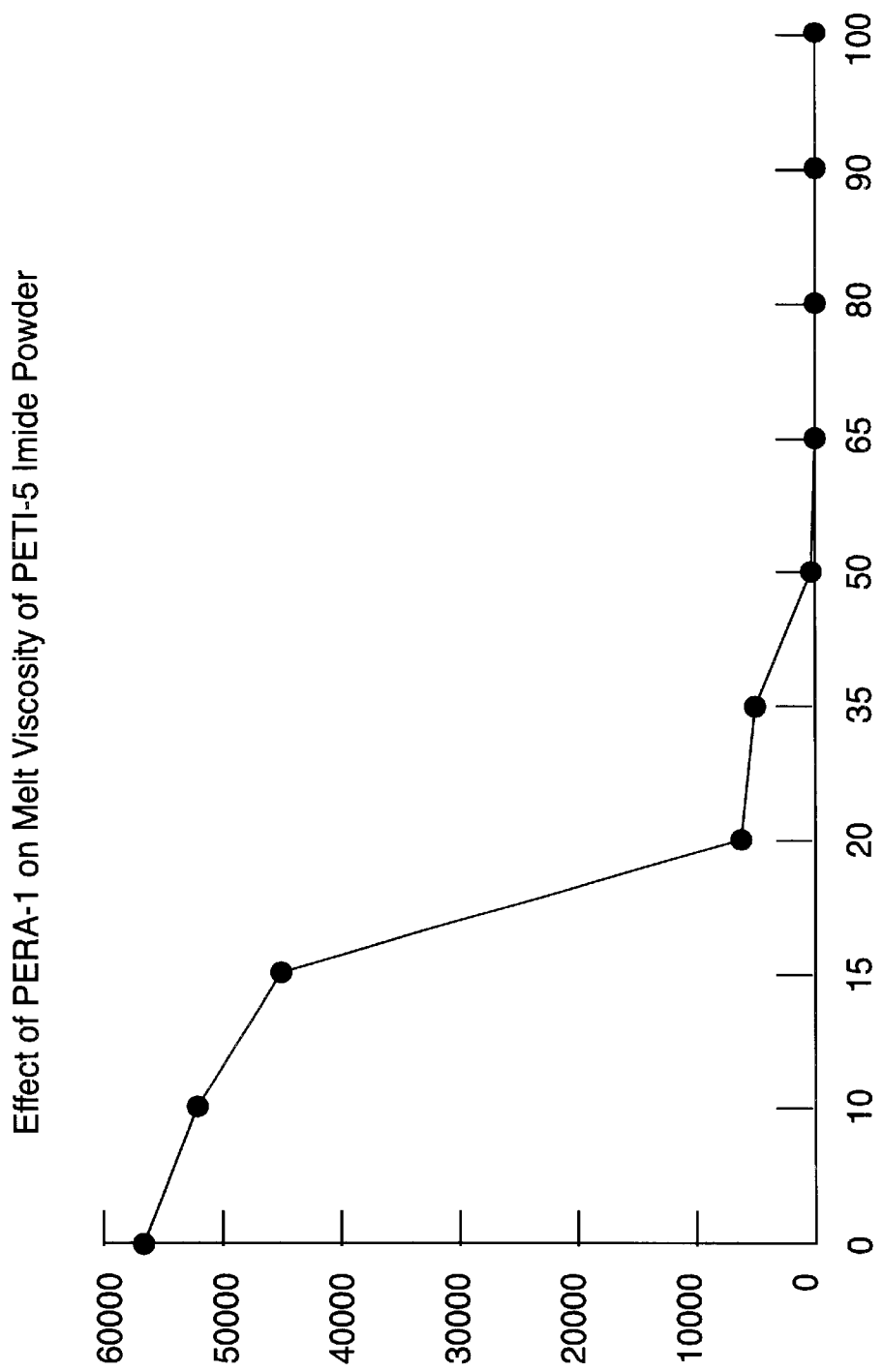
FIG. 3 illustrates the effect of PERA-1 on the melt viscosity of PETI-5 imide powder.

The data in Table 1 indicates that the most drastic reduction in complex melt viscosity occurred with a PERA-1 loading of 20 weight %. Higher loading results in a continued decrease in complex melt viscosity as shown in FIG. 3. The composition containing 10 weight % PETI-5 exhibits a dramatic reduction in the temperature at which the lowest complex melt viscosity is observed, decreasing from ~371° C. to ~270 ° C.

The imide of PERA-1 was mixed at a 20 weight % loading with the amide acid of PETI-5 in NMP at a concentration of ~35% weight/weight. To this solution was added toluene and the mixture was heated under a Dean Stark trap to remove the water of imidization. The PETI-5 imide powder precipitated during this imidization. The mixture was poured into water and the solid isolated and dried. This material exhibited an initial thermal transition ~180° C. and a $T_g$ of 272° C. and a melting transition of 443° C. after curing for one hour at 350° C. The minimum complex melt viscosity was 14500 poise at 367° C.

Unidirectional carbon fiber (IM-7, unsized, 3 k tow) prepeg was prepared by solution coating from an NMP solution (35% solids) of the imide of PERA-1 (20%)/PETI-5 amide acid (80%). The prepeg was processed into composite laminates under 50 psi whereas composite laminates of the same lay-up and number of plys fabricated from PETI-5 prepeg are typically processed under 200 psi. Laminate data is presented in Table 2. The effect of the PERA-1 concentration on the minimum melt viscosity of PETI-5 imide powder is presented graphically in FIG. 3.

TABLE 2

IM-7 Laminate Properties*

| Property | PETI-5 (200 psi processing) | PERA-1/PETI-5 20/80 (50 psi processing) |
|---|---|---|
| $T_g$, ° C. (G') | 270 | 290 |
| Open Hole Compression Strength, Ksi | | |
| 23° C. | 56.5 | 58.4 |
| 177° C. (wet) | 46.3 | 46.8 |
| Compression After Impact Strength, Ksi | 48.0 | 47.2 |
| 23° C. | | |
| Failure Strain, μin/in | 5800 | 5900 |
| Modulus, Msi | 8.1 | 8.5 |

*Normalized to 62% fiber volume

The imide of PERA-1 was also mixed at a 35 weight % loading with the amide acid of PETI-5 in NMP at a concentration of ~35% weight/weight. To this solution was added toluene and the mixture was heated under a Dean Stark trap to remove the water of imidization. The PETI-5 imide powder precipitated during this imidization. The mixture was poured into water and the solid isolated and dried. This material exhibited an initial thermal melting transition at ~149° C. and a $T_g$ of 289° C. by DSC after curing for one hour at 350° C. in a sealed aluminum pan. PETI-5 cured under identical conditions exhibits a $T_g$ of 250° C. and a melting transition at 387° C. The minimum complex melt viscosity was 315 poise at 371° C. This minimum complex melt viscosity is an order of magnitude lower than that observed when the two imide powders were physically mixed at the same concentration.

Figure 4:
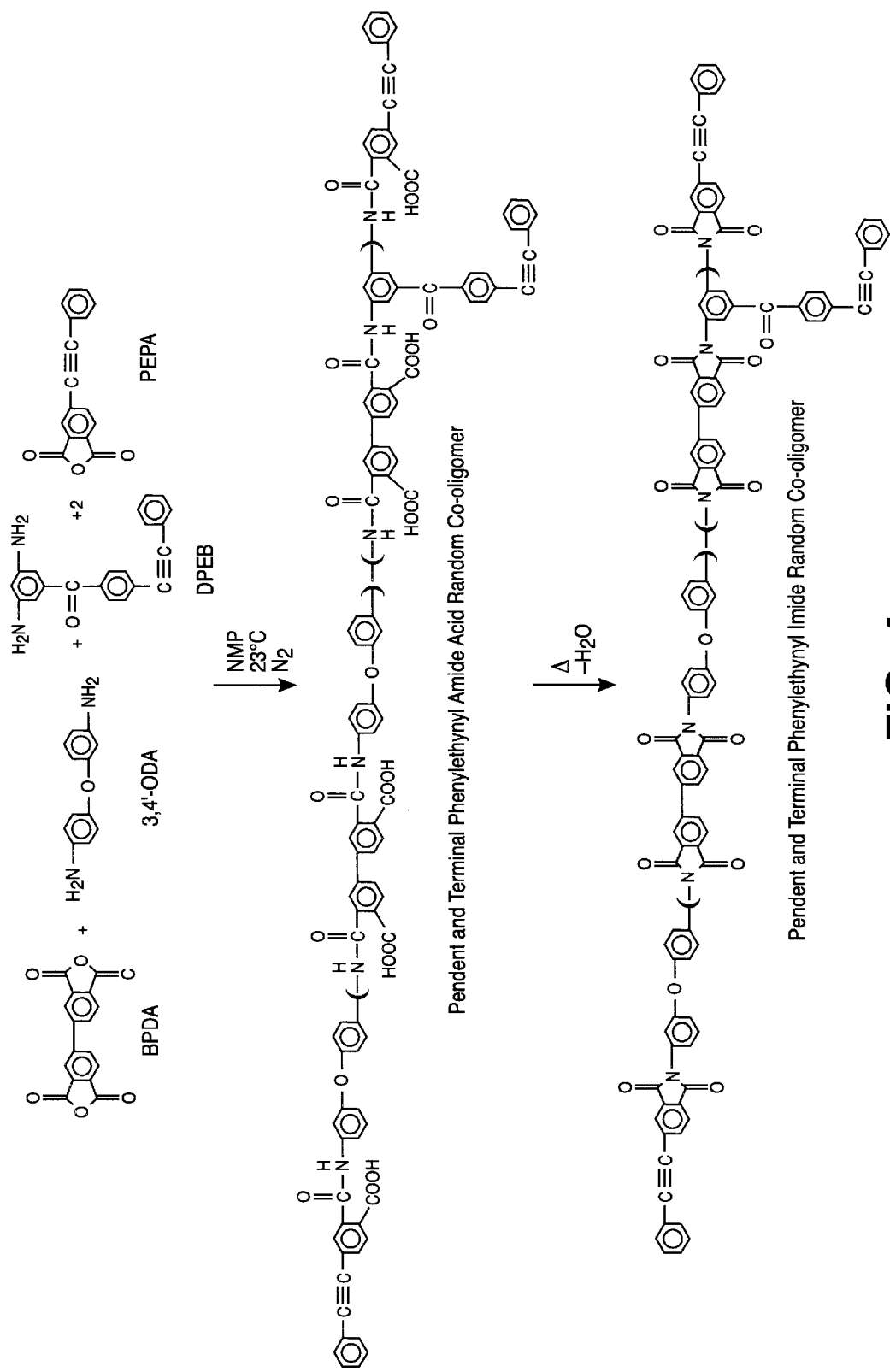
FIG. 4 is an equation showing the preparation of Random Amide Acid and Imide Co-oligomers (PTPEI-1).

Favorable results were obtained from formulations of PERA-1 and an imide oligomer containing both pendent and terminal phenylethynyl groups with a calculated number average molecular weight of 5000 g/mole (designated PTPEI-1). The preparation of PTPEI-1 is presented in FIG. 4. PTPEI amide acid in NMP and imide powder were prepared from 3,4,3',4'-biphenyltetracarboxylic dianhydride (BPDA) (0.91 mole), 3,4'-oxydianiline (3,4'-ODA), 3,5-diamino-4'-phenylethynyl-benzophenone (DPEB) (0.15 mole) and 4-phenylethynylphthalic anhydride (PEPA) (0.18 mole) according to the procedure previously reported by J. G. Smith, Jr., *Adhesion Society Proceedings*, Vol. 19, 29–32 (1996). PERA-1 in the imide form was physically mixed with imide powder of PTPEI-1 at concentrations of 10, 20, and 50% by weight and the resultant formulation were characterized for complex melt viscosity and thermal properties. The data is presented in Table 3.

TABLE 3

Characterization of Physically Mixed Imide Powders of PERA-1 and PTPEI-I

| PERA-1 Weight % | PTPEI-1 Weight % | Thermal Transition Temp., ° C. Initial | Thermal Transition Temp., ° C. Cured* | Minimum Complex Melt Viscosity, poise | Temp. of Minimum Viscosity, ° C. |
|---|---|---|---|---|---|
| 100 | 0 | 191, 230 | ND | <1 | 265 |
| 50 | 50 | 197 | 3236 | 7200 | 368 |
| 20 | 80 | 195 | 322 | 26300 | 368 |
| 10 | 90 | 195 | 318 | 37400 | 361 |
| 0 | 100 | 231 | 307 | 150600 | 362 |

*Cured for 1 hour at 350° C. in a sealed aluminum pan.
ND = Not detected by DSC.

Dramatic reductions in the minimum melt viscosity were observed with only 10 weight percent of PERA-1 while the cured $T_g$ increased substantially.

Figure 5:
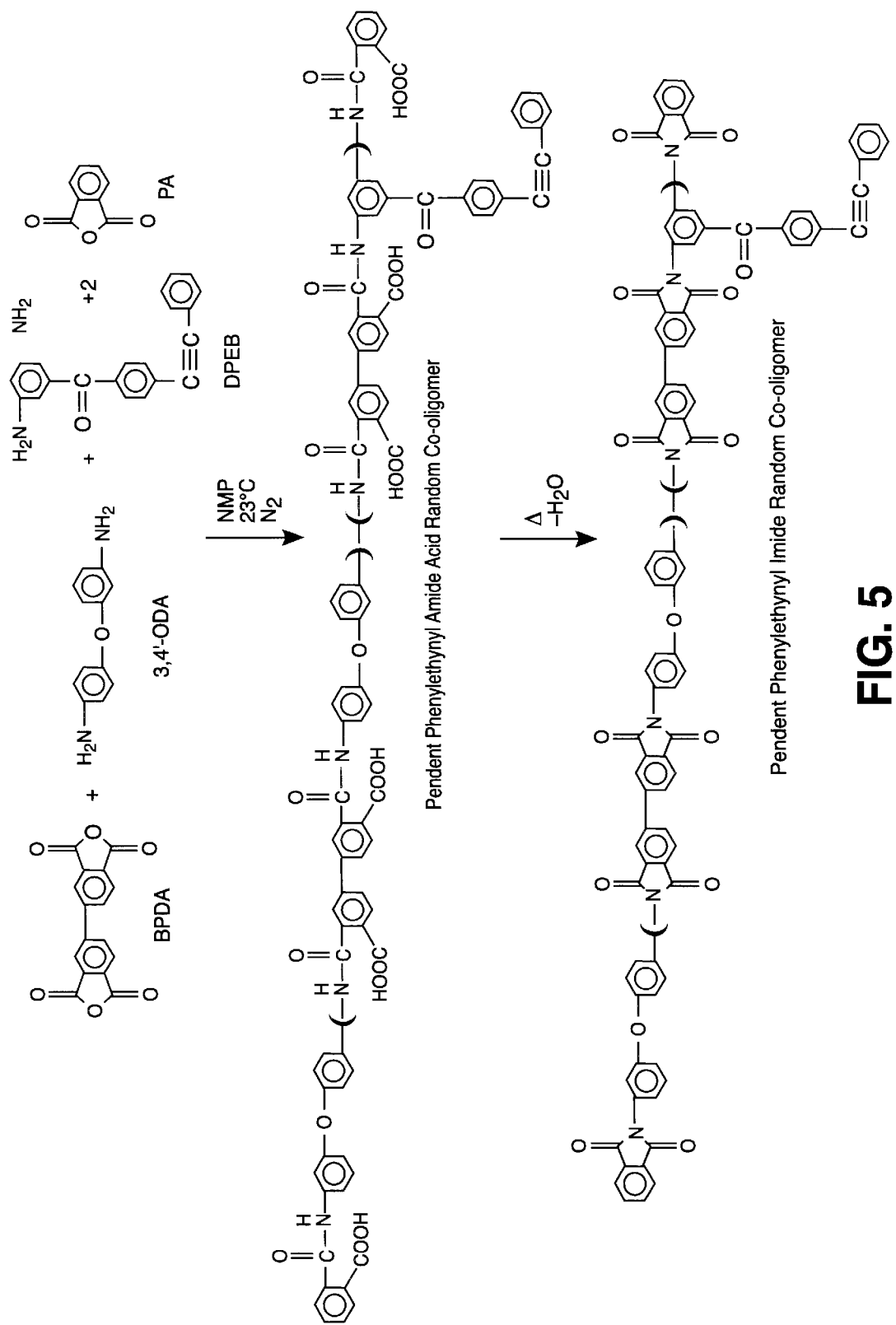
FIG. 5 is an equation showing the preparation of Random Amide Acid and Imide Co-oligomers (PPEI-1).

Favorable results were also obtained from formulations of PERA-1 and an imide oligomer containing pendent phenylethynyl groups with a calculated number average molecular weight of 5000 g/mole (designated as PPEI-1). The preparation of PPEI-1 is present in FIG. 5. PPEI-1 amide acid in NMP and imide powder were prepared from 3,4,3',4'-biphenyltetracarboxylic dianhydride (BPDA) (0.91 mole), 3,4'-oxydianiline (3,4'-ODA) (0.85 mole), 3,5-diamino-4'-phenylethynylbenzophenone (DPEB) (0.15 mole) and phthalic anhydride (PA) (0.18 mole) according to the procedure previously reported by J. W. Connell, J. G. Smith, Jr. And P. M. Hergenrother, *Society for the Advancement of Materials and Process Engineering Proceedings*, Vol. 41, 1102–1112 (1996). PERA-1 in the imide form was physically mixed with the imide powder of PPEI-1 at concentrations of 10, 20, and 50% by weight and the resultant formulations were characterized for complex melt viscosity and thermal properties. The data is presented in Table 4.

TABLE 4

Characterization of Physically Mixed Imide Powders of PERA-1 and PPEI-I

| PERA-1 Weight % | PPEI-1, Weight % | Thermal Transition Temp., ° C. Initial | Thermal Transition Temp., ° C. Cured* (Melting temp.) | Minimum Complex Melt Viscosity, poise | Temp. of Minimum Viscosity, ° C. |
|---|---|---|---|---|---|
| 100 | 0 | 182 | ND | <1 | 270 |
| 50 | 50 | 149 | ND | 1308 | 369 |
| 20 | 80 | 149 | 270 (380) | 10125 | 370 |
| 10 | 90 | 150 | 268 (379) | 13400 | 370 |
| 0 | 100 | 209 | 267 (380) | 60000 | 371 |

*Cured for 1 hour at 350° C. in a sealed aluminum pan.
ND = Not detected by DSC.

PERA-1/PPEI-1 formulations exhibited similar trends as PERA-1/PETI-5 and PERA-1/PTPEI-1 formulations, but to a lesser degree with respect to reductions in melt viscosity and changes in thermal properties.

Favorable results were also obtained with formulations of PERA-2 and PETI-5 imide powders. Melt viscosity and thermal properties are presented in Table 5.

TABLE 5

Characterization of Physically Mixed Imide Powders of PERA-2 and PETI-5

| PERA-2 Weight % | PETI-5, Weight % | Thermal Transition Temp., ° C. Initial | Thermal Transition Temp., ° C. Cured* (Melting temp.) | Minimum Complex Melt Viscosity, poise | Temp. of Minimum Viscosity, ° C. |
|---|---|---|---|---|---|
| 100 | 0 | 179, 235 | ND | <1 | 270 |
| 50 | 50 | 178 | 286 | 50 | 370 |
| 20 | 80 | 180 | 276 (385) | 20000 | 371 |
| 10 | 90 | 181 | 275 (384) | 45000 | 370 |
| 0 | 100 | 235 | 250 (387) | 56500 | 371 |

*Cured for 1 hour at 350° C. in a sealed aluminum pan.
ND = Not detected by DSC.

Good results were also obtained with formulations of PERA-3 and PETI-5 imide powders. Melt viscosity and thermal properties are presented in Table 6.

TABLE 6

Characterization of Physically Mixed Imide Powders of PERA-3 and PETI-5

| PERA-3 Weight % | PETI-5, Weight % | Thermal Transition Temp., ° C. Initial | Thermal Transition Temp., ° C. Cured* (Melting temp.) | Minimum Complex Melt Viscosity, poise | Temp. of Minimum Viscosity, ° C. |
|---|---|---|---|---|---|
| 100 | 0 | 191, 230 | ND | <1 | 265 |
| 50 | 50 | 197 | ND | 625 | 367 |
| 20 | 80 | 195 | 272 (384) | 9990 | 369 |
| 10 | 90 | 195 | 269 (381) | 48300 | 371 |
| 0 | 100 | 235 | 250 (387) | 56500 | 371 |

*Cured for 1 hour at 350° C. in a sealed aluminum pan.
ND = Not detected by DSC.

Formulations of PERA-2/PETI-5 and PERA-3/PETI-5 exhibited similar trends with respect to initial thermal transitions, cured $T_g$ and reduction in melt viscosity as observed with PERA-1/PETI-5 imide powder formulations.

Having generally described the invention, a more complete understanding thereof can be obtained by reference to the following examples, which are provided herein for purposes of illustration only and do not limit the invention.

Synthesis of Phenylethynyl Containing Reactive Additives (PERAs)

EXAMPLE 1

Synthesis of PERA-1 from 3,5-Diamino-4'-phenylethynylbenzophenone (1.0 mole), Phthalic Anhydride (1.0 mole) and 4-Phenylethynylphthalic Anhydride (1.0 mole)

Into a 3 L three-neck round-bottom flask equipped with a mechanical stirrer, thermometer and reflux condenser was placed 3,5-diamino-4'-phenylethynylbenzophenone (187.4 g, 0.60 mole), phthalic anhydride (88.9 g, 0.60 mole), 4-phenylethynylphthalic anhydride (148.9 g, 0.60 mole) and glacial acetic acid (785 mL, 34% solids). The mixture was heated to reflux (~120° C.) to give a dark brown solution. After ~2 hours at this temperature a large amount of light tan precipitate formed making stirring impossible. Heating was continued for an additional hour and the reaction mixture was cooled to room temperature. The product was isolated by filtration and washed three times in warm water to remove residual acetic acid. The solid was air dried for ~36 hours and subsequently placed in a forced air oven at 125° C. for 15 hours. The light tan powder (397 g, 98% of theoretical yield) exhibited a melting transition at 182° C., and an exothermic transition due to the thermal reaction of the phenylethynyl groups beginning at 346° C. and peaking at 381° C. as determined by DSC. The heat of the reaction was ~275 J/g.

The amide acid of PERA-1 was prepared in a 3 L three-necked round-bottom flask equipped with a mechanical stirrer, nitrogen inlet and drying tube using 3,5-diamino-4'-phenylethynylbenzophenone (289.4 g, 0.926 mole), phthalic anhydride (137.2 g, 0.926 mole), 4-phenylethynylphthalic anhydride (230.0 g, 0926 mole) and NMP (1180 mL, 35% solids). Initially, the diamine was dissolved in 400 mL of NMP and the dianhydrides were added as a slurry in 250 mL of NMP. Additional NMP (350 mL) was used to rinse in all of the solids. The mixture was stirred at room temperature under nitrogen for ~72 hr (for convenience, this much time is not necessary). This solution was used to prepare formulations with various phenylethynyl containing oligomers.

EXAMPLE 2

Synthesis of PERA-2 from 3,5-Diamino-4'-phenylethynylbenzophenone (1.0 mole), Phthalic Anhydride (1.5 mole) and 4-phenylethynylphthalic Anhydride (0.5 mole)

Into a 500 mL three-neck round-bottom flask equipped with a mechanical stirrer, thermometer and reflux condenser was placed 3,5-dimaino-4'-phenylethynylbenzophenone (23.43 g, 75.0 mmole), phthalic anhydride (16.66 g, 112.5 mmole), 4-phenylethynylphthalic anhydride (9.31 g, 37.5 mmole) and glacial acetic acid (125 mL, 30% solids). The mixture was heated to reflux (~120° C.) to give a dark brown solution. After ~2 hours at this temperature a large amount of light tan precipitate formed making stirring impossible. Heating was continued for an additional hour and the reaction mixture was cooled to room temperature. The product was isolated by filtration and washed three times in warm water to remove residual acetic acid. The solid was air dried for ~15 hours and subsequently placed in a forced air oven at 130° C. for 6 hours. The light tan powder (45.0 g, 96% of theoretical yield) exhibited a melting transition at ~179° C. and 235° C., and an exothermic transition due to the thermal reaction of the phenylethynyl groups beginning at 346° C. and peaking at 383° C. as determined by DSC. The heat of the reaction was ~209 J/g.

EXAMPLE 3

Synthesis of PERA-3 from 3,5-Diamino-4'-phenylethynylbenzophenone (1.0 mole), Phthalic Anhydride (0.5 mole) and 4-Phenylethynylphthalic Anhydride (1.5 mole)

Into a 500 mL three-neck round-bottom flask equipped with a mechanical stirrer, thermometer and reflux condenser was placed 3,5-dimaino-4'-phenylethynylbenzophenone (21.98 g, 70.4 mmole), phthalic anhydride (5.211 g, 35.2 mmole), 4-phenylethynylphthalic anhydride (26.20 g, 105.5 mmole) and glacial acetic acid (200 mL, 20% solids). The mixture was heated to reflux (~120° C.) to give a dark brown solution. After ~2 hours at this temperature a large amount of light tan precipitate formed making stirring impossible. Heating was continued for an additional hour and the reaction mixture was cooled to room temperature. The product was isolated by filtration and washed three times in warm water to remove residual acetic acid. The solid was dried in a forced air oven at 130° C. for 15 hours. The light tan powder (50.20 g, 99% of theoretical yield) exhibited a melting transition at ~191° C. and 230° C., and an exothermic transition due to the thermal reaction of the phenylethynyl groups beginning at 340° C. and peaking at 374° C. as determined by DSC. The heat of the reaction was ~281 J/g.

EXAMPLE 4

Resin from Physical Mixture of Imide Powders of PERA-1 (10% by weight) and PETI-5 (90% by weight)

Into a plastic vial was placed PETI-5 imide powder (4.5 g) and PERA-1 imide powder (0.5 g). The two solids were physically mixed with a spatula for 10 minutes. The cap was placed on the vial and the vial shaken repeatedly to further mix the solids. The material exhibited an initial thermal transition by DSC at 183° C. The material was cured for one hour at 350° C. in a sealed aluminum pan. Upon reheating, the material exhibited a $T_g$ at 278° C. and a melting transition at 392° C. The material exhibited a minimum melt viscosity of 52,000 poise at ~371° C.

EXAMPLE 5

Resin from Physical Mixture of Imide Powders of PERA-1 (15% by weight) and PETI-5 (85% by weight)

Into a plastic vial was placed PETI-5 imide powder (4.25 g) and PERA-1 imide powder (0.75 g). The two solids were physically mixed with a spatula for 10 minutes. The cap was placed on the vial and the vial shaken repeatedly to further mix the solids. The material exhibited an initial thermal transition by DSC at 185° C. The material was cured for one hour at 350° C. in a sealed aluminum pan. Upon reheating, the material exhibited a $T_g$ at 276° C. and a melting transition at 390° C. The material exhibited a minimum melt viscosity of 44,700 poise at ~371° C.

EXAMPLE 6

Resin from Physical Mixture of Imide powders of PERA-1 (20% by weight) and PBTI-5 (80% by weight)

Into a plastic vial was placed PETI-5 imide powder (4.0 g) and PERA-1 imide powder (1.0 g). The two solids were physically mixed with a spatula for 10 minutes. The cap was placed on the vial and the vial shaken repeatedly to further mix the solids. The material exhibited an initial thermal transition by DSC at 182° C. The material was cured for one hour at 350° C. in a sealed aluminum pan. Upon reheating, the material exhibited a $T_g$ at 273° C. and a melting transition at 393° C. The material exhibited a minimum melt viscosity of 5600 poise at ~371° C.

EXAMPLE 7

Resin from Physical Mixture of Imide Powders of PERA-1 (35% by weight) and PETI-5 (65% by weight)

Into a plastic vial was placed PETI-5 imide powder (3.25 g) and PERA-1 imide powder (1.75 g). The two solids were physically mixed with a spatula for 10 minutes. The cap was placed on the vial and the vial shaken repeatedly to further mix the solids. The material exhibited an initial thermal transition by DSC at 183° C. The material was cured for one hour at 350° C. in a sealed aluminum pan. Upon reheating, the material exhibited no $T_g$ or melting transition by DSC. The material exhibited a minimum melt viscosity of 4700 poise at ~372° C.

EXAMPLE 8

Resin from Physical Mixture of Imide Powders of PERA-1 (50% by weight) and PETI-5 (50% by weight)

Into a plastic vial was placed PETI-5 imide powder (2.5 g) and PERA-1 imide powder (2.5 g). The two solids were physically mixed with a spatula for 10 minutes. The cap was placed on the vial and the vial shaken repeatedly to further mix the solids. The material exhibited an initial thermal transition by DSC at 182° C. The material was cured for one hour at 350° C. in a sealed aluminum pan. Upon reheating, the material exhibited no $T_g$ or melting transition by DSC. The material exhibited a minimum melt viscosity of 500 poise at ~371 ° C.

EXAMPLE 9

Resin from Physical Mixture of Imide Powders of PERA-1 (65% by weight) and PETI-5 (35% by weight)

Into a plastic vial was placed PETI-5 imide powder (1.75 g) and PERA-1 imide powder (3.25 g). The two solids were physically mixed with a spatula for 10 minutes. The cap was placed on the vial and the vial shaken repeatedly to further mix the solids. The material exhibited an initial thermal transition by DSC at 182° C. The material was cured for one hour at 350° C. in a sealed aluminum pan. Upon reheating, the material exhibited no $T_g$ or melting transition by DSC. The material exhibited a minimum melt viscosity of 53 poise at ~371° C.

EXAMPLE 10

Resin from Physical Mixture of Imide Powders of PERA-1 (80% by weight) and PETI-5 (20% by weight)

Into a plastic vial was placed PETI-5 imide powder (1.0 g) and PERA-1 imide powder (4.0 g). The two solids were physically mixed with a spatula for 10 minutes. The cap was placed on the vial and the vial shaken repeatedly to further mix the solids. The material exhibited an initial thermal transition by DSC at 183° C. The material was cured for one hour at 350° C. in a sealed aluminum pan. Upon reheating, the material exhibited no $T_g$ or melting transition by DSC. The material exhibited a minimum melt viscosity of 21 poise at 373° C.

EXAMPLE 11

Resin from Physical Mixture of Imide Powders of PERA-1 (90% by weight) and PETI-5 (10% by weight)

Into a plastic vial was placed PETI-5 imide powder (0.5 g) and PERA-1 imide powder (4.5 g). The two solids were physically mixed with a spatula for 10 minutes. The cap was placed on the vial and the vial shaken repeatedly to further mix the solids. The material exhibited an initial thermal transition by DSC at 182° C. The material was cured for one hour at 350° C. in a sealed aluminum pan. Upon reheating, the material exhibited no $T_g$ or melting transition by DSC. The material exhibited a minimum melt viscosity of 14 poise at ~270° C.

EXAMPLE 12

Resin from Mixture of Imide Powder of PERA-1 (20% by weight) and PETI-5 amide acid (80% by weight).

PETI-5 amide acid solution (7397.0 g of solution=2588.9 g of amide acid, 35% solids in NMP) was placed in a large metal container and a solution of PERA-1 (647.2 g, 35% solids in NMP) was added. The two solutions were stirred at room temperature under nitrogen for ~16 hours. The resulting homogenous solution exhibited a Brookfield viscosity of 8700 centipoise. This solution was used to prepare unidirectional carbon fiber (IM-7, unsized, 3 k tow) prepeg. The prepeg was subsequently used to prepare laminates in a vacuum press and in an autoclave using the following processing cycle. The laminates were heated under vacuum at 250° C. and held for one hour to remove volatiles and affect imidization. Pressure (50 psi) was subsequently applied and the laminate heated to 371° C. and held for one hour. The laminate was cooled to room temperature under pressure and vacuum. Laminates processed under this cycle were well consolidated and void-free as evidenced by ultrasonic inspection. Mechanical properties of the composite laminates are presented in Table 2.

EXAMPLE 13

Resin from Mixture of Imide Powder of PERA-1 (35% by weight) and PETI-5 amide acid (65% by weight)

PETI-5 amide acid solution (4051.0 g of solution=1417.9 g of amide acid, 35% solids in NMP) was placed in a large metal container and a solution of PERA-1 (777.0 g, 40% solids in NMP) was added. The two solutions were stirred at room temperature under nitrogen for ~16 hours. The resulting homogenous solution exhibited a Brookfield viscosity of 3000 centipoise. This solution was used to prepare unidirectional carbon fiber (IM-7, unsized, 3 k tow) prepeg. The prepeg was subsequently used to prepare laminates in a vacuum press and in an autoclave using the following processing cycle. The laminates were heated under vacuum at 250° C. and held for one hour to remove volatiles and affect imidization. Pressure (50 psi) was subsequently applied and the laminate heated to 371° C. and held for one hour. The laminate was cooled to room temperature under pressure and vacuum. Laminates processed under this cycle were well consolidated and void-free as evidenced by ultrasonic inspection. Due to low resin content in the prepeg (~28–30%), mechanical properties were not determined.

EXAMPLE 14

Resin from Mixture of Imide Powder of PERA-1 (50% by weight) and PETI-5 amide acid (50% by weight).

PETI-5 amide acid solution (1818.0 g of solution=727.2 g of amide acid, 40% solids in NMP) was placed in a large metal container and a solution of PERA-1 (724.2 g, 30% solids in NMP) was added. The two solutions were stirred at room temperature under nitrogen for ~6 hours. The resulting homogenous solution exhibited a Brookfield viscosity of ~1000 centipoise. This solution was used to prepare unidirectional carbon fiber (IM-7, unsized, 3 k tow) prepeg. The prepeg was subsequently used to prepare laminates in a vacuum press and in an autoclave using the following processing cycle. The laminates were heated under vacuum at 300° C. and held for one hour to remove volatiles and affect imidization. Pressure (25 psi) was subsequently applied and the laminate heated to 371° C. and held for one hour. The laminate was cooled to room temperature under pressure and vacuum. Laminates processed under this cycle were well consolidated and void-free as evidenced by ultrasonic inspection. Unidirectional laminates (6"×6" 12 plies thick) were fabricated in an autoclave under 1–15 psi. The laminates appeared well consolidates, however ultrasonic inspection revealed poor to moderate consolidation even though excessive resin flow was evident.

EXAMPLE 15

Resin from Amide Acid of PERA-1 (20% by weight) and PETI-5 amide acid (80% by weight)

PETI-5 amide acid solution (7490 g of solution=2621.5 g of amide acid, 35% solids in NMP) was placed in a large metal container and a solution of PERA-1 (1855 g, 35% solids in NMP) was added. The two solutions were stirred at room temperature under nitrogen for ~16 hours. The resulting homogenous solution exhibited a Brookfield viscosity of ~6800 centipoise. This solution was used to prepare unidirectional carbon fiber (IM-7, unsized, 3 k tow) prepeg. The prepeg was subsequently used to prepare laminates in a vacuum press and in an autoclave using the following processing cycle. The laminates were heated under vacuum at 250–300° C. and held for one hour to remove volatiles and affect imidization. Pressure (50 psi) was subsequently applied and the laminate heated to 371° C. and held for one hour. The laminate was cooled to room temperature under pressure and vacuum. Laminates processed under this cycle were well consolidated and void-free as evidenced by ultrasonic inspection. Adhesive properties are presented in Table 4.

EXAMPLE 16

Resin from Physical Mixture of Imide Powders of PERA-1 (10% by weight) and PTPEI-1 (90% by weight)

Into a plastic vial was placed PTPEI-1 imide powder (0.50 g) and PERA-1 imide powder (4.50 g). The two solids were physically mixed with a spatula for 10 minutes. The cap was placed on the vial and the vial shaken repeatedly to further mix the solids. The material exhibited an initial thermal transition by DSC at 196° C. The material was cured for 1 hour at 350° C. in a sealed aluminum pan. Upon reheating, the material exhibited a $T_g$ at 318° C. PTPEI-1 exhibits a $T_g$ of 307° C. after curing for one hour at 350° C. in a sealed aluminum pan. The material exhibited a minimum complex melt viscosity of 37400 poise at ~361° C. PTPEI exhibited a minimum complex melt viscosity of 150600 poise at ~362° C.

EXAMPLE 17

Resin from Physical Mixture of Imide Powders of PERA-1 (20% by weight) and PTPEI-1 (80% by weight)

Into a plastic vial was placed PTPEI-1 imide powder (1.0 g) and PERA-1 imide powder (4.0 g). The two solids were physically mixed with a spatula for 10 minutes. The cap was placed on the vial and the vial shaken repeatedly to further mix the solids. The material exhibited an initial thermal transition by DSC at 150° C. The material was cured for 1 hour at 350° C. in a sealed aluminum pan. Upon reheating, the material exhibited a $T_g$ at 322° C. PTPEI-1 exhibits a $T_g$ of 307° C. after curing for one hour at 350° C. in a sealed aluminum pan. The material exhibited a minimum complex melt viscosity of 26300 poise at ~368° C. PTPEI exhibited a minimum complex melt viscosity of 150600 poise at ~362° C.

EXAMPLE 18

Resin from Physical Mixture of Imide Powders of PERA-1 (50% by weight) and PTPEI-1 (50% by weight)

Into a plastic vial was placed PTPEI-1 imide powder (2.50 g) and PERA-1 imide powder (2.50 g). The two solids were physically mixed with a spatula for 10 minutes. The cap was placed on the vial and the vial shaken repeatedly to further mix the solids. The material exhibited an initial thermal transition by DSC at 150° C. The material was cured for 1 hour at 350° C. in a sealed aluminum pan. Upon reheating, the material exhibited a $T_g$ at 326° C. PTPEI-1 exhibits a $T_g$ of 307° C. after curing for one hour at 350° C. in a sealed aluminum pan. The material exhibited a minimum complex melt viscosity of 7200 poise at ~368° C. PTPEI exhibited a minimum complex melt viscosity of 150600 poise at ~362° C.

EXAMPLE 19

Resin from Physical Mixture of Imide powders of PERA-1 (10% by weight) and PPEI-1 (90% by weight)

Into a plastic vial was placed PPEI-1 imide powder (4.50 g) and PERA-1 imide powder (0.50 g). The two solids were physically mixed with a spatula for 10 minutes. The cap was placed on the vial and the vial shaken repeatedly to further mix the solids. The material exhibited an initial thermal transition by DSC at 150° C. The material was cured for 1 hour at 350° C. in a sealed aluminum pan. Upon reheating, the material exhibited a $T_g$ at 379° C. PPEI-1 exhibits a $T_g$ of 267° C. and a melting transition at 379° C. PPEI-1 exhibits a $T_g$ of 267° C. and a melting transition of 380° C. after curing for one hour at 350° C. in a sealed aluminum pan. The material exhibited a minimum complex melt viscosity of 13,400 poise at ~370° C. PPEI exhibited a minimum complex melt viscosity of 60,000 poise at ~371° C.

EXAMPLE 20

Resin from Physical Mixture of Imide Powders of PERA-1 (20% by weight) and PPEI-1 (80% by weight)

Into a plastic vial was placed PPEI-1 imide powder (4.0 g) and PERA-1 imide powder (1.0 g). The two solids were physically mixed with a spatula for 10 minutes. The cap was placed on the vial and the vial shaken repeatedly to further mix the solids. The material exhibited an initial thermal transition by DSC at 149° C. The material was cured for 1 hour at 350° C. in a sealed aluminum pan. Upon reheating, the material exhibited a $T_g$ at 270° C. and a melting transition at 380° C. PPEI-1 exhibits a $T_g$ of 267° C. and a melting transition of 380° C. after curing for one hour in a sealed aluminum pan. The material exhibited a minimum complex melt viscosity of 10,125 poise at ~370° C. PPEI exhibited a minimum complex melt viscosity of 60,000 poise at 371° C.

EXAMPLE 21

Resin from Physical Mixture of Imide Powders of PERA-1 (50% by weight) and PPEI-1 (50% by weight)

Into a plastic vial was placed PPEI-1 imide powder (2.50 g) and PERA-1 imide powder (2.50 g). The two solids were physically mixed with a spatula for 10 minutes. The cap was placed on the vial and the vial shaken repeatedly to further mix the solids. The material exhibited an initial thermal transition by DSC at 149° C. The material was cured for 1 hour at 350° C. in a sealed aluminum pan. Upon reheating, no $T_g$ or melting transition was detected by DSC. PPEI-1 exhibits a $T_g$ of 267° C. and a melting transition of 380° C. after curing for one hour at 350° C. in a sealed aluminum pan. The material exhibited a minimum complex melt viscosity of 1308 poise at ~369° C. PPEI exhibited a minimum complex melt viscosity of 60,000 poise at ~371° C.

EXAMPLE 22

Resin from Physical Mixture of Imide Powders of PERA-2 (10% by weight) and PETI-5 (90% by weight)

Into a plastic vial was placed PETI-5 imide powder (4.50 g) and PERA-2 imide powder (0.50 g). The two solids were physically mixed with a spatula for 10 minutes. The cap was placed on the vial and the vial shaken repeatedly to further mix the solids. The material exhibited an initial thermal transition by DSC at 181° C. The material was cured for 1 hour at 350° C. in a sealed aluminum pan. Upon reheating, the material exhibited a $T_g$ at 275° C. and a melting transition at 384° C. PETI-5 exhibits a $T_g$ of 250° C. and a melting transition of 387° C. after curing for one hour at 350° C. in a sealed aluminum pan. The material exhibited a minimum complex melt viscosity of 45,000 poise at ~370° C. PETI-5 exhibited a minimum complex melt viscosity of 56,500 poise at ~371° C.

EXAMPLE 23

Resin from Physical Mixture of Imide Powders of PERA-2 (20% by weight) and PETI-5 (80% by weight)

Into a plastic vial was placed PETI-5 imide powder (4.0 g) and PERA-2 imide powder (1.0 g). The two solids were physically mixed with a spatula for 10 minutes. The cap was placed on the vial and the vial shaken repeatedly to further mix the solids. The material exhibited an initial thermal transition by DSC at 180° C. The material was cured for 1 hour at 350° C. in a sealed aluminum pan. Upon reheating, the material exhibited a $T_g$ at 276° C. and a melting transition at 385° C. PETI-5 exhibits a $T_g$ of 250° C. and a melting transition of 387° C. after curing for one hour at 350° C. in a sealed aluminum pan. The material exhibited a minimum complex melt viscosity of 20,000 poise at ~371° C. PETI-5 exhibited a minimum complex melt viscosity of 56,500 poise at ~371° C.

EXAMPLE 24

Resin from Physical Mixture of Imide powders of PERA-2 (50% by weight) and PETI-5 (50% by weight)

Into a plastic vial was placed PETI-5 imide powder (2.50 g) and PERA-2 imide powder (2.50 g). The two solids were physically mixed with a spatula for 10 minutes. The cap was placed on the vial and the vial shaken repeatedly to further mix the solids. The material exhibited an initial thermal transition by DSC at 178° C. The material was cured for 1 hour at 350° C. in a sealed aluminum pan. Upon reheating, the material exhibited a $T_g$ at 286° C. and no melting transition was detected. PETI-5 exhibits a $T_g$ of 250° C. and a melting transition of 387° C. after curing for one hour at 350° C. in a sealed aluminum pan. The material exhibited a minimum complex melt viscosity of 50 poise at ~370° C. PETI-5 exhibited a minimum complex melt viscosity of 56,500 poise at ~371° C.

EXAMPLE 25

Resin from Physical Mixture of Imide Powders of PERA-3 (10% by weight) and PETI-5 (90% by weight)

Into a plastic vial was placed PETI-5 imide powder (4.50 g) and PERA-3 imide powder (0.50 g). The two solids were physically mixed with a spatula for 10 minutes. The cap was placed on the vial and the vial shaken repeatedly to further mix the solids. The material exhibited an initial thermal transition by DSC at 195° C. The material was cured for 1 hour at 350° C. in a sealed aluminum pan. Upon reheating, the material exhibited a $T_g$ at 269° C. and a melting transition at 381° C. PETI-5 exhibits a $T_g$ of 250° C. and a melting transition of 387° C. after curing for one hour at 350° C. in a sealed aluminum pan. The material exhibited a minimum complex melt viscosity of 48,300 poise at ~371° C. PETI-5 exhibited a minimum complex melt viscosity of 56,500 poise at ~371° C.

EXAMPLE 26

Resin from Physical Mixture of Imide Powders of PERA-3 (20% by weight) and PETI-5 (80% by weight)

Into a plastic vial was placed PETI-5 imide powder (4.0 g) and PERA-3 imide powder (1.0 g). The two solids were physically mixed with a spatula for 10 minutes. The cap was placed on the vial and the vial shaken repeatedly to further mix the solids. The material exhibited an initial thermal transition by DSC at 195° C. The material was cured for 1 hour at 350° C. in a sealed aluminum pan. Upon reheating, the material exhibited a $T_g$ at 272° C. and a melting transition at 384° C. PETI-5 exhibits a $T_g$ of 250° C. and a melting transition of 387° C. after curing for one hour at 350° C. in a sealed aluminum pan. The material exhibited a minimum complex melt viscosity of 9990 poise at ~369° C. PETI-5 exhibited a minimum complex melt viscosity of 56,500 poise at ~371° C.

EXAMPLE 27

Resin from Physical Mixture of Imide Powders of PERA-3 (50% by weight) and PETI-5 (50% by weight)

Into a plastic vial was placed PETI-5 imide powder (2.50 g) and PERA-2 imide powder (2.50 g). The two solids were physically mixed with a spatula for 10 minutes. The cap was placed on the vial and the vial shaken repeatedly to further mix the solids. The material exhibited an initial thermal transition by DSC at 197° C. The material was cured for 1 hour at 350° C. in a sealed aluminum pan. Upon reheating, no $T_g$ or melting transition was detected. PETI-5 exhibits a $T_g$ of 250° C. and a melting transition of 387° C. after curing for one hour at 350° C. in a sealed aluminum pan. The material exhibited a minimum complex melt viscosity of 625 poise at ~367° C. PETI-5 exhibited a minimum complex melt viscosity of 56,500 poise at ~371° C.

EXAMPLE 28

Synthesis of a phenylethynyl terminated amide acid and imide co-oligomer with a calculated number average molecular weight of 1,000 g/mole using 3,3',4,4'-biphenyltetracarboxylic dianhydride (BPDA, 0.5552 mole), 1,3-bis(3-aminophenoxyphenyl)benzene (1,3-APB, 0.52 mole), 9,9-bis(4-aminophenyl)fluorene (FDA, 0.33 mole), 3,5-diamino-4'-phenylethynyl benzophenone (DPEB, 0.15 mole) and 4-phenylethynylphthalic anhydride (PEPA, 0.8896 mole).

Into a 100 ml three neck round bottom flask equipped with a mechanical stirrer, thermometer and nitrogen inlet/outlet was placed 1,3-APB (2.8263 g, 0.0097 mole), FDA (2.1379 g, 0.0061 mole), DPEB (0.8712 g, 0.0028 mole) and 10 mL N-methyl-2-pyrrolidinone (NMP). Once dissolved, a slurry of BPDA (3.0371 g, 0.0103 mole) and PEPA (4.1058 g, 0.0165 mole) in 9 mL of NMP was added and rinsed in with an additional 10 mL of NMP to afford a solids content of 30.2%. The mixture was stirred overnight under nitrogen (all solids had dissolved at this point). Toluene was then added (60 mL) and the reaction flask was fitted with a Dean Stark trap and reflux condenser. The mixture was heated via an oil bath to 185° C. and held overnight. The toluene was removed from the system via the Dean Stark trap (the reaction temperature eventually reached ~205° C. during the toluene removal) and the reaction solution was allowed to cool to room temperature. The solution was poured into water in a blender to precipitate the oligomer. The solid was isolated by filtration, washed in warm water (by placing in a large beaker and stirring) two times. The solid was allowed to air dry overnight and further dried in a forced air oven at ~130° C. for ~8 hours to give a quantitative yield of a tan powder. The powder exhibited an initial $T_g$ of 162° C. and $T_m$ of 210° C. and a $T_g$ of 362° C. after curing for 1 hour at 371° C. The powder exhibited a complex melt viscosity of 185 poise at 250° C., this viscosity was stable at 250° C. for the duration of the experiment (1 hour). The powder exhibited a complex melt viscosity of 40 poise at 280° C., this viscosity was stable at 280° C. for the duration of the experiment (2 hours). A neat resin molding, approximately 1.5 inches in diameter and 25 mils thick, was fabricated by heating the powder in an aluminum pan to 371° C. for 1 hour in air. Based on a qualitative test of the molding, it was moderately tough.

EXAMPLE 29

Resin from Physical Mixture of Imide Powders of PERA-1 (10% by weight) and PTPEI described above (90% by weight)

Into a plastic vial was placed PTPEI (305-91-087) imide powder (2.67 g) and PERA-1 imide powder (0.30 g). The two solids were physically mixed with a spatula for 10 minutes. The cap was placed on the vial and the vial shaken repeatedly to further mix the solids. The powder exhibited an initial $T_g$ of 160° C. and $T_m$ of 196° C. and a $T_g$ of 340° C. after curing for 1 hour at 371° C. The powder exhibited a complex melt viscosity of 90 poise at 250° C., this viscosity was stable at 250° C. for the duration of the experiment (1 hour). The powder exhibited a complex melt viscosity of 35 poise at 280° C., this viscosity was stable at 280° C. for the duration of the experiment.

A carbon fiber laminate (10 inches by 24 inches, 36 plys thick, 44/44/12 layup) was fabricated from this material by a resin infusion process. The laminate was well-consolidated and contained low void content. Specimens were machined from the laminate and tested for open hole tension strength and open hole compression strength at temperatures ranging from room temperature to 600° F. The material exhibited excellent properties at both room temperature with good retention of strengths up to temperatures of 600° F.

While the invention has been described in terms of its preferred embodiments, those skilled in the art will recognize that the invention can be practiced with modification within the spirit and scope of the appended claims.

We claim:

1. A cured film formed by adding a phenylethynyl reactive additive to a host phenylethynyl containing polymer, wherein the phenylethynyl reactive additive has a molecular weight less than approximately 1000 g/mol and is selected from the group consisting of amide acid phenylethynyl reactive additives and imide phenylethynyl reactive additives.

2. A cured resin molding formed by adding a phenylethynyl reactive additive to a host phenylethynyl containing polymer, wherein the phenylethynyl reactive additive has a molecular weight less than approximately 1000 g/mol and is selected from the group consisting of amide acid phenylethynyl reactive additives and imide phenylethynyl reactive additives.

3. A cured adhesive formed by adding a phenylethynyl reactive additive to a host phenylethynyl containing polymer, wherein the phenylethynyl reactive additive has a molecular weight less than approximately 1000 g/mol and is selected from the group consisting of amide acid phenylethynyl reactive additives and imide phenylethynyl reactive additives.

4. A composite formed by adding a phenylethynyl reactive additive to a host phenylethynyl containing polymer, wherein the phenylethynyl reactive additive has a molecular weight less than approximately 1000 g/mol and is selected from the group consisting of amide acid phenylethynyl reactive additives and imide phenylethynyl reactive additives.

5. A cured film according to claim 1 wherein the phenylethynyl containing host polymer is prepared from 3,4,3',4'-biphenyltetracarboxylic dianhydride, 3,4'-oxydianiline, 1,3-bis(3-aminophenoxy) benzene, and 4-phenylethynylphthalic anhydride.

6. A cured resin molding according to claim 2 wherein the phenylethynyl containing host polymer is prepared from 3,4,3',4'-biphenyltetracarboxylic dianhydride, 3,4'-oxydianiline, 1,3-bis(3-aminophenoxy) benzene, and 4-phenylethynylphthalic anhydride.

7. A cured adhesive according to claim 3 wherein the phenylethynyl containing host polymer is prepared from 3,4,3',4'-biphenyltetracarboxylic dianhydride, 3,4'-oxydianiline, 1,3-bis(3-aminophenoxy) benzene, and 4-phenylethynylphthalic anhydride.

8. A composite according to claim 4 wherein the phenylethynyl containing host polymer is prepared from 3,4,3',4'-biphenyltetracarboxylic dianhydride, 3,4'-oxydianiline, 1,3-bis(3-aminophenoxy) benzene, and 4-phenylethynylphthalic anhydride.

9. A cured film according to claim 1 wherein the phenylethynyl containing host polymer is prepared from 3,4,3',4'-biphenyltetracarboxylic dianhydride, 3,4'-oxydianiline, 3,5-diamino-4'-phenylethynylbenzophenone, and 4-phenylethynylphthalic anhydride.

10. A cured resin molding according to claim 2 wherein the phenylethynyl containing host polymer is prepared from 3,4,3',4'-biphenyltetracarboxylic dianhydride, 3,4'-oxydianiline, 3,5-diamino-4'-phenylethynylbenzophenone, and 4-phenylethynylphthalic anhydride.

11. A cured adhesive according to claim 3 wherein the phenylethynyl containing host polymer is prepared from 3,4,3',4'-biphenyltetracarboxylic dianhydride, 3,4'-oxydianiline, 3,5-diamino-4'-phenylethynylbenzophenone, and 4-phenylethynylphthalic anhydride.

12. A composite according to claim 4 wherein the phenylethynyl containing host polymer is prepared from 3,4,3',4'-biphenyltetracarboxylic dianhydride, 3,4'-oxydianiline, 3,5-diamino-4'-phenylethynylbenzophenone, and 4-phenylethynylphthalic anhydride.

13. A cured film according to claim 1 wherein the phenylethynyl containing host polymer is prepared from 3,4,3',4'-biphenyltetracarboxylic dianhydride, 3,4'-oxydianiline, 3,5-diamino-4'-phenylethynylbenzophenone and phthalic anhydride.

14. A cured resin molding according to claim 2 wherein the phenylethynyl containing host polymer is prepared from 3,4,3',4'-biphenyltetracarboxylic dianhydride, 3,4'-oxydianiline, 3,5-diamino-4'-phenylethynylbenzophenone and phthalic anhydride.

15. A cured adhesive according to claim 3 wherein the phenylethynyl containing host polymer is prepared from 3,4,3',4'-biphenyltetracarboxylic dianhydride, 3,4'-oxydianiline, 3,5-diamino-4'-phenylethynylbenzophenone and phthalic anhydride.

16. A composite according to claim 4 wherein the phenylethynyl containing host polymer is prepared from 3,4,3',4'-biphenyltetracarboxylic dianhydride, 3,4'-oxydianiline, 3,5-diamino-4'-phenylethynylbenzophenone and phthalic anhydride.

17. A cured film according to claim 1 wherein the phenylethynyl containing host polymer is prepared from 3,3',4,4'-biphenyltetracarboxylic dianhydride, 1,3-bis(3-aminophenoxyphenyl)benzene, 9,9-bis(4-aminophenyl)fluorene, 3,5-diamino-4'-phenylethynylbenzophenone and 4-phenylethynylphthalic anhydride.

18. A cured resin molding according to claim 2 wherein the phenylethynyl containing host polymer is prepared from 3,3',4,4'-biphenyltetracarboxylic dianhydride, 1,3-bis(3-aminophenoxyphenyl)benzene, 9,9-bis(4-aminophenyl)fluorene, 3,5-diamino-4'-phenylethynylbenzophenone and 4-phenylethynylphthalic anhydride.

19. A cured adhesive according to claim 3 wherein the phenylethynyl containing host polymer is prepared from 3,3',4,4'-biphenyltetracarboxylic dianhydride, 1,3-bis(3-aminophenoxyphenyl)benzene, 9,9-bis(4-aminophenyl)fluorene, 3,5-diamino-4'-phenylethynylbenzophenone and 4-phenylethynylphthalic anhydride.

20. A composite according to claim 4 wherein the phenylethynyl containing host polymer is prepared from 3,3',4,4'-biphenyltetracarboxylic dianhydride, 1,3-bis(3-aminophenoxyphenyl)benzene, 9,9-bis(4-aminophenyl)fluorene, 3,5-diamino-4'-phenylethynylbenzophenone and 4-phenylethynylphthalic anhydride.

21. A cured film according to claim 1 wherein the phenylethynyl reactive additive is prepared from 3,5-diamino-4'-phenylethynylbenzophenone, and equal molar amounts of phthalic anhydride and 4-phenylethynylphthalic anhydride.

22. A cured resin molding according to claim 2 wherein the phenylethynyl reactive additive is prepared from 3,5- diamino-4'-phenylethynylbenzophenone, and equal molar amounts of phthalic anhydride and 4-phenylethynylphthalic anhydride.

23. A cured adhesive according to claim 3 wherein the phenylethynyl reactive additive is prepared from 3,5-diamino-4'-phenylethynylbenzophenone, and equal molar amounts of phthalic anhydride and 4-phenylethynylphthalic anhydride.

24. A composite according to claim 4 wherein the phenylethynyl reactive additive is prepared from 3,5-diamino-4'-phenylethynylbenzophenone, and equal molar amounts of phthalic anhydride and 4-phenylethynylphthalic anhydride.

25. A cured film according to claim 1 wherein the phenylethynyl reactive additive is prepared from 1 mole of 3,5-diamino-4'-phenylethynylbenzophenone, 1.5 moles of phthalic anhydride and 0.5 moles of 4-phenylethynylphthalic anhydride.

26. A cured resin molding according to claim 2 wherein the phenylethynyl reactive additive is prepared from 1 mole of 3,5-diamino-4'-phenylethynylbenzophenone, 1.5 moles of phthalic anhydride and 0.5 moles of 4-phenylethynylphthalic anhydride.

27. A cured adhesive according to claim 3 wherein the phenylethynyl reactive additive is prepared from 1 mole of 3,5-diamino-4'-phenylethynylbenzophenone, 1.5 moles of phthalic anhydride and 0.5 moles of 4-phenylethynylphthalic anhydride.

28. A composite according to claim 4 wherein the phenylethynyl reactive additive is prepared from 1 mole of 3,5-diamino-4'-phenylethynylbenzophenone, 1.5 moles of phthalic anhydride and 0.5 moles of 4-phenylethynylphthalic anhydride.

29. A cured film according to claim 1 wherein the phenylethynyl reactive additive is prepared from 1 mole of 3,5-diamino-4'-phenylethynylbenzophenone, 0.5 moles of phthalic anhydride and 1.5 moles of 4-phenylethynylphthalic anhydride.

30. A cured resin molding according to claim 2 wherein the phenylethynyl reactive additive is prepared from 1 mole of 3,5-diamino-4'-phenylethynylbenzophenone, 0.5 moles of phthalic anhydride and 1.5 moles of 4-phenylethynylphthalic anhydride.

31. A cured adhesive according to claim 3 wherein the phenylethynyl reactive additive is prepared from 1 mole of 3,5-diamino-4'-phenylethynylbenzophenone, 0.5 moles of phthalic anhydride and 1.5 moles of 4-phenylethynylphthalic anhydride.

32. A composite according to claim 4 wherein the phenylethynyl reactive additive is prepared from 1 mole of 3,5-diamino-4'-phenylethynylbenzophenone, 0.5 moles of phthalic anhydride and 1.5 moles of 4-phenylethynylphthalic anhydride.

33. A cured film according to claim 1 wherein the phenylethynyl containing host polymer is a co-polymer.

34. A cured resin molding according to claim 2 wherein the phenylethynyl containing host polymer is a co-polymer.

35. A cured adhesive according to claim 3 wherein the phenylethynyl containing host polymer is a co-polymer.

36. A composite according to claim 4 wherein the phenylethynyl containing host polymer is a co-polymer.

37. A cured film according to claim 1 wherein the phenylethynyl containing host polymer is an oligomer.

38. A cured resin molding according to claim 2 wherein the phenylethynyl containing host polymer is an oligomer.

39. A cued adhesive to claim 3 wherein the phenylethynyl containing host polymer is an oligomer.

40. A composite according to claim 4 wherein the phenylethynyl containing host polymer is an oligomer.

41. A cured film according to claim 1 wherein the phenylethynyl containing host polymer is a co-oligomer.

42. A cured resin molding according to claim 2 wherein the phenylethynyl containing host polymer is a co-oligomer.

43. A cured adhesive according to claim 3 wherein the phenylethynyl containing host polymer is a co-oligomer.

44. A composite according to claim 4 wherein the phenylethynyl containing host polymer is a co-oligomer.

45. A cured film according to claim 1 wherein the phenylethynyl containing host polymer is in solution and the phenylethynyl reactive additive is in an amide acid solution.

46. A cured resin molding according to claim 2 wherein the phenylethynyl containing host polymer is in solution and the phenylethynyl reactive additive is in an amide acid solution.

47. A cured adhesive according to claim 3 wherein the phenylethynyl containing host polymer is in solution and the phenylethynyl reactive additive is in an amide acid solution.

48. A composite according to claim 4 wherein the phenylethynyl containing host polymer is in solution and the phenylethynyl reactive additive is in an amide acid solution.

49. A cured film according to claim 1 wherein the phenylethynyl containing host polymer is in solution and the phenylethynyl reactive additive is in an imide solution.

50. A cured resin molding according to claim 2 wherein the phenylethynyl containing host polymer is in solution and the phenylethynyl reactive additive is in an imide solution.

51. A cured adhesive according to claim 3 wherein the phenylethynyl containing host polymer is in solution and the phenylethynyl reactive additive is in an imide solution.

52. A composite according to claim 4 wherein the phenylethynyl containing host polymer is in solution and the phenylethynyl reactive additive is in an imide solution.

53. A cured film according to claim 1 wherein the phenylethynyl containing host polymer is a dry powder and the phenylethynyl reactive additive is a dry imide powder.

54. A cured resin molding according to claim 2 wherein the phenylethynyl containing host polymer is a dry powder and the phenylethynyl reactive additive is a dry imide powder.

55. A cured adhesive according to claim 3 wherein the phenylethynyl containing host polymer is a dry powder and the phenylethynyl reactive additive is a dry imide powder.

56. A composite according to claim 4 wherein the phenylethynyl containing host polymer is a dry powder and the phenylethynyl reactive additive is a dry imide powder.

* * * * *